US006701964B1

(12) United States Patent
Maurice

(10) Patent No.: US 6,701,964 B1
(45) Date of Patent: Mar. 9, 2004

(54) VORTEX GENERATING AIRFOIL FUEL SAVER

(76) Inventor: Michael R. Maurice, 23 Garfield AV, Barre, VT (US) 05641

( * ) Notice: Subject to any disclaimer, the term of this patent is extended or adjusted under 35 U.S.C. 154(b) by 0 days.

(21) Appl. No.: 10/461,573

(22) Filed: Jun. 14, 2003

(51) Int. Cl.$^7$ ................................................. F15D 1/02
(52) U.S. Cl. .......................... 138/39; 138/37; 366/336; 366/338; 123/306; 123/590
(58) Field of Search .................... 138/39, 37; 48/180.1, 48/189.4; 366/336, 338; 123/306, 590

(56) References Cited

U.S. PATENT DOCUMENTS

| | | | | |
|---|---|---|---|---|
| 3,671,208 A | * | 6/1972 | Medsker ..................... | 48/180.1 |
| 3,995,663 A | * | 12/1976 | Perry .......................... | 138/38 |
| 4,310,028 A | * | 1/1982 | Kennedy ..................... | 138/39 |
| 4,344,404 A | * | 8/1982 | Child et al. .................. | 123/538 |
| 4,706,910 A | * | 11/1987 | Walsh et al. ................. | 244/130 |
| 4,811,702 A | * | 3/1989 | Oppie et al. ............. | 123/188.14 |
| 6,550,446 B1 | * | 4/2003 | Robley, Jr. .................. | 123/306 |

* cited by examiner

Primary Examiner—James Hook
(74) Attorney, Agent, or Firm—Donald W. Meeker

(57) ABSTRACT

A vortex generating fuel saving device is installed on the air intake hose to a fuel injector. An airfoil body creates a spiral vortex of air spiraling off of its outer edge, thereby increasing the air in the fuel-air mixture to the fuel injectors. The airfoil body is mounted on the forward rim of the air intake hose by a clip, and is positioned inside of the hose with the edge of the airfoil in the center of the hose. The airfoil creates a spiral vortex, which is in concentric relation to the interior of the hose, thereby allowing maximum mixture of air in the fuel-air mixture. The airfoil is capable of being adjusted in width so that the outer edge of the airfoil blade is positioned in the center of any of a variety of sizes of fuel injector air intake hoses.

8 Claims, 2 Drawing Sheets

VORTEX GENERATING AIRFOIL FUEL SAVER

BACKGROUND OF THE INVENTION

1. Field of the Invention

This invention relates generally to internal combustion engines, and more particularly to an airfoil installed in the fuel injector air intake hose to create a vortex for increasing air to the fuel-air mixture to make the engine more fuel-efficient.

2. Description of the Prior Art

A number of devices have been developed to increase fuel efficiency in internal combustion engines by mixing more air with the fuel. Often this is done by creating a spinning effect in the incoming airflow to mix more air with the fuel and increase fuel efficiency by 15–25% while also reducing air pollution by burning the fuel cleaner with more of the fuel burned, thereby giving off fewer pollutants.

Aircraft wings are known to produce a wake turbulence in the form of a vortex at the wing tips sometimes producing a 30–40% drag on the wing. Wings develop lift by having a shorter airflow distance under the wing over a relatively straight surface versus a longer airflow over the convex curvature of the top of the wing thereby creating lift due to the pressure difference. The intermingling of the two airstreams coming together at different angles produces the turbulent vortex.

In many gasoline engines, fuel is supplied to the intake manifold of the engine by way of a carburetor or fuel injector having an air intake. During operation of the engine, air is drawn in through the carburetor over a layer of gasoline sitting in a bowl within the carburetor. The gasoline in the bowl is maintained at a certain level, which is unrelated to engine displacement and power output. Even with optimum carburetion, some relatively large droplets or particles of gasoline or other fuel become mixed with the fuel vapor being drawn into the engine cylinders via the engine intake manifold. During the combustion process, these droplets do not burn completely. Therefore the fuel comprising those droplets does not contribute as much as it should to engine output power and it is expelled from the combustion chambers, appearing in the engine exhaust as unburned hydrocarbons or other atmospheric pollutants.

Various apparatus have been proposed heretofore to improve the fuel efficiency of internal combustion engines. However, these prior devices have tended to be rather complicated and to require active control by the vehicle operator.

U.S. Pat. No. 4,310,028, issued Jan. 12, 1982 to Kennedy, describes the method and apparatus for increasing the fluid throughput of a conduit. The fluid throughput of a conduit is increased without increasing the power requirements or the size of the conduit by affixing to the inner surface of the conduit at least one airfoil located with its leading edge facing into the flow substantially at the beginning of rectilinear flow. The airfoil advantageously has a body portion, a head portion, and a tail portion wherein the body portion has upper and lower planar surfaces defined by substantially parallel planes, side portions defined by substantially parallel side planes which are substantially normal to the upper and lower parallel planes, the head portion has a bulbous portion extending substantially below the lower parallel plane and the tail portion extends substantially below the lower parallel planes but not as far below as the bulbous portion.

U.S. Pat. No. 5,140,969, issued Aug. 25, 1992 to Barclay, provides an automatic fuel saver for a vehicle engine that comprises a cyclonic turbulence chamber for connection between the engine intake manifold and the carburetor that supplies a fuel-air stream to the manifold. An air scoop is positioned at the front of the vehicle to collect supplemental air due to the forward motion of the vehicle. The supplemental air is conducted by a conduit to the turbulence chamber where it is introduced tangentially into the chamber and mixes cyclonically with the fuel-air stream being drawn into the engine from the carburetor, thereby providing supplemental oxygen to the engine in an amount which varies directly with the forward speed of the vehicle and the engine power demand.

U.S. Pat. No. 6,550,446, issued Apr. 22, 2003 to Robley, Jr., is for an air intake flow device that manipulates the airflow in an air entry chamber of a positive displacement internal combustion engine. The air intake flow device is comprised of a skirt defining an air flow passageway, multiple vanes extending into the airflow passageway from a first leading edge at the surface of the skirt. The configuration of the vanes direct the airflow into a vortex like configuration which is understood to improve air intake across the intake valve into the combustion chamber and thereby improve oxidation of the fuel. The airflow device is preferably constructed in a fashion so that the installer of the device can readily adapt its configuration by applying hand pressure from a first manufactured configuration to second installation configuration. Thus, the device is suitable for adaptation to various air entry chamber shapes.

U.S. Pat. No. 4,537,173, issued Aug. 27, 1985 to Norris, discloses a fuel distribution system for a multi-cylinder internal combustion engine that includes an intake manifold. The intake manifold has a tubular inlet stack with an inlet including a mounting for a carburetor on the top thereof and a plurality of runner passages extending generally transverse to the bottom of the stack and to intake ports at each cylinder. The manifold includes a housing downstream of the stack providing a freely rotatable mounting for a shaft having a plurality of axial flow turbine blades thereon and a radial flow impeller is also mounted on the shaft, spaced from the turbine blades. The stack has a cylindrical interior wall section closely fitted to the turbine blades, defining therewith a ducted velocity turbine, and beneath the stack the housing surrounds the impeller and is connected to each of the runner passages, whereby all fuel/air mixture passes through the turbine and impeller. Usually the shaft is supported for rotation about a vertical axis, and a diffuser may be provided in the housing, being arranged in a generally horizontal circle surrounding the impeller to direct a flow of fuel/air mixture exciting the impeller radially outward through said runner passages. The impeller includes a surface extending through a curvature of approximately 90.degree. and a plurality of impeller blades projecting from its surface to accept the flow of fuel/air mixture exiting the turbine and to change the direction of such flow while returning energy into such flow.

U.S. Pat. No. 5,662,079, issued Sep. 2, 1997 to Snider, indicates manifold flow turning vanes in internal combustion engines, some of which are an ideal airfoil type. Gas flow pressure losses through fuel charge and exhaust gas flow conduits for internal combustion engines are greatly reduced by turning vanes in conduit flow bends of greater than 9.degree. around an inside radius of less than twice the effective diameter of the conduit. Such turning vanes are preferably given leading edge bevels of about 20.degree. to 24.degree. and trailing edge bevels of 13.degree. to 17.degree., which are substantially centered about an arc radius through the angular center of the flow bend.

U.S. Pat. No. 5,979,395, issued Nov. 9, 1999 to Mallen, illustrates a method for reducing the exhaust pollution emissions in a two-stroke sliding vane internal combustion engine. First, fresh air is inducted into a vane cell, and fuel is injected into the cell at an ultra-lean fuel-air equivalence ratio less than about 0.65. The fuel is injected at a location such that a circumferential distance at mid-cell-height to the stator site at the onset of combustion is at least about 4 times a vane cell height at intake. The ultra-lean fuel-air combination is then compressed and thoroughly premixed prior to combustion to a dimensionless concentration fluctuation fraction below about 0.25. The ultra-lean, thoroughly premixed fuel-air combination is then combusted. The combusted fuel-air combination is purged after an expansion cycle. The premixing step prior to combustion may use inclined airfoils within the intake duct to produce counter-rotating mixing vortices.

U.S. Pat. No. 5,836,282, issued Nov. 17, 1998 to Mallen, provides a method for reducing the exhaust pollution emissions in a two-stroke sliding vane internal combustion engine. First, fresh air is inducted into a vane cell, and fuel is injected into the cell at an ultra-lean fuel-air equivalence ratio less than about 0.65. The fuel is injected at a location such that a circumferential distance at mid-cell-height to the stator site at the onset of combustion is at least about 4 times a vane cell height at intake. The ultra-lean fuel-air combination is then compressed and thoroughly premixed prior to combustion to a dimensionless concentration fluctuation fraction below about 0.25. The ultra-lean, thoroughly premixed fuel-air combination is then combusted. The combusted fuel-air combination is purged after an expansion cycle. The premixing step prior to combustion may use inclined airfoils within the intake duct to produce counter-rotating mixing vortices.

U.S. Pat. No. 4,811,702, issued Mar. 14, 1988 to Oppie, concerns an improved intake port for an internal combustion engine, which has an airfoil integral with the intake port, causing increased laminar flow to the air/fuel passing through the port. The push rod and guide pass through the center of the airfoil, allowing a straight through port, thus providing greater efficiencies to the air/fuel flow through the port.

What is needed is a device that uses an airfoil shape, which creates a spiral vortex in the air intake hose to the fuel injection system to make the engine more fuel efficient, and can be easily installed in a standard air intake hose for fuel injectors.

SUMMARY OF THE INVENTION

An object of the present invention is to provide a device that uses an airfoil shape, which creates a spiral vortex in the air intake hose of the fuel injector that increase air to the fuel-air mixture ingested by the engine in order to make the engine more fuel efficient.

Another object of the present invention is to provide a device that improves fuel burning efficiency in order to reduce air pollution caused by the engine.

One more object of the present invention is to provide a device that has a clip-type-mounting arm, which can be easily installed over the forward rim of a standard air intake hose for fuel injectors.

An additional object of the present invention a device with an airfoil body that is capable of being adjusted in width so that the outer edge of the airfoil blade is centrally positioned in any of a variety of sizes of air intake hoses, which are used for fuel injectors.

In brief, a vortex generating fuel saving device clips onto a forward end of an air intake hose for a fuel injector. The device includes an airfoil, which comprises an airfoil body that has a convex face on one side of the airfoil body that has a curved surface, which is capable of receiving an airflow along a path over the convex face. The airfoil body has an opposite face on the other side of the airfoil body, which has a straighter surface than the curved surface. The straighter surface is capable of receiving an airflow along a shorter path than that of the convex face and the outer edge between the two faces, so that the two airflows meet and intermix along the outer edge they create a spiral vortex of air, which spirals off of the outer edge in the direction of the airflows into the air intake hose moving into the fuel injector.

The device also includes a clip means that has an elongated rigid arm with a flat airfoil receiving face and an elongated flexible arm, which is spaced apart from and attached to the rigid arm by a top-connecting portion. The flexible arm of the clip is normally biased toward the rigid arm so that when the fuel injector intake hose is disconnected and the clip is clipped to the forward lip of the fuel injector air intake hose a tension force is created by the flexible arm, which holds the device in place on the fuel injector air intake hose allowing the hose to be reconnected with the air intake system to the fuel injector while holding the airfoil in the desired position. The flexible arm of the clip is fabricated of a flexible metal.

The airfoil is permanently attached to the rigid arm on the flat airfoil receiving face, and is spaced apart from the top of the clip by an inset distance, so that the clip means can be clipped over a forward rim of a cylindrical air intake hose for a fuel injector, with the flexible arm on an exterior surface of the air intake hose. The top-connecting portion rests on the forward rim of the air intake hose, and the rigid arm rests against an interior wall of the air intake hose. The airfoil extends from the interior wall to a central point in the air intake hose with its outer edge centrally positioned in the air intake hose. The airfoil is spaced from the forward rim of the air intake hose by the inset distance, and is capable of generating a spiral vortex of air from the outer edge of the airfoil into the air intake hose. The spiral vortex of air is concentric with the cylindrical air intake hose, and moves toward the fuel injector.

The airfoil is capable of being adjusted in width so that the outer edge of the airfoil blade can be positioned in the center of any of a variety of sizes of air intake hoses, which are used for fuel injectors. The airfoil can be fabricated of a material, such as a shaped rubberized synthetic material, which is capable of being cut to adjust its width and to form the outer edge at any desired distance from the clip means. The preferred material is Duralco® a heat resistant and chemical resistant rubber-like material which holds its shape and which can be cut to size.

The airfoil body can alternately be fabricated of molded plastic with a series of linear perforated lines or scores that run parallel to the clip with each of the perforated lines or scores spaced apart from the clip a distance equal to half a diameter of a standard fuel injector air intake hose. Portions of the airfoil body are capable of being broken away at a desired perforated line to adjust the width and to form an outer edge of the airfoil body, which is capable of being positioned in the center of the standard fuel injector air intake hose with the clip attached to the standard fuel injector air intake hose.

The present invention can improve fuel efficiency by 15–25% and increases power by about 13 horsepower.

An advantage of the present invention is that it increases the fuel efficiency of an engine.

Another advantage of the present invention is that it decreases the amount of air pollution produced by the engine.

An additional advantage of the present invention is that it is easily installed.

One more advantage of the present invention is that the user may modify the size of the device.

Yet another advantage of the present invention is that it is inexpensive to manufacture.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

In FIGS. 1–4, a vortex generating fuel saving device 20 and 20A is illustrated, which is for an air intake to a fuel injector.

Figure 2:
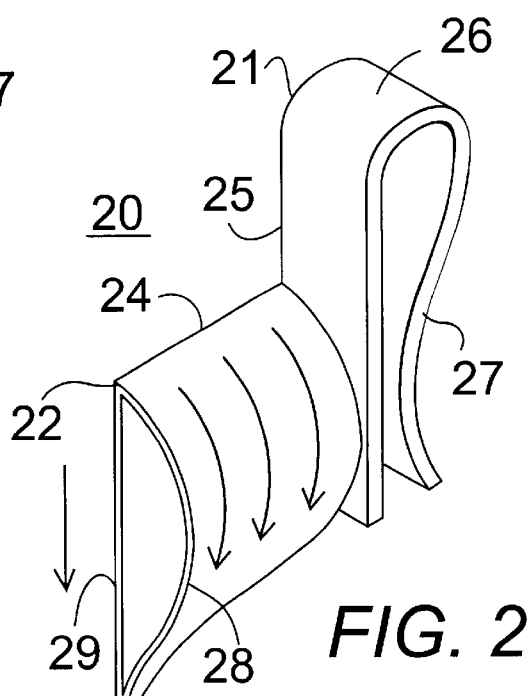
FIG. 2 is a perspective view of the preferred embodiment of the invention of FIG. 1 showing the airflows over the airfoil body and the spiral vortex generated by the mixing of the airflows coming off the tip of the outer edge.

The device 20 and 20A includes an airfoil, which comprises an airfoil body 22 and 22A that has a convex face 28 on one side of the airfoil body, which has a curved surface that is capable of receiving an airflow along a path over the convex face 28, as shown by the curved arrows in FIG. 2. The airfoil body 22 and 22A has an opposite face 29 on the other side of the airfoil body, which has a straighter surface than the curved surface, and preferably flat. The straighter surface is capable of receiving an airflow, shown by the straight arrow, along a shorter path than that of the convex face 28 and the outer edge 23 between the two faces, so that the two airflows meet along the outer edge 23 and create a spiral vortex 40 of air, which spirals off of the outer edge 23 in the direction of the airflows, as shown in FIGS. 2 and 4.

The device 20 and 20A also includes a clip means 21 that has an elongated rigid arm 25 with a flat airfoil receiving face and an elongated flexible arm 27, which is spaced apart from and attached to the rigid arm 25 by a top connecting portion 26. The flexible arm 27 of the clip 21 is normally biased toward the rigid arm 25 so that when the clip means 21 is clipped to the fuel injector air intake hose 30 a tension force is created by the flexible arm 27, which holds the device 20 and 20A in place on the front rim 31 of the fuel injector air intake hose 30. The flexible arm 27 of the clip 21 is fabricated of a flexible metal. The airfoil 22 and 22A is permanently attached to the rigid arm 25 and is spaced apart from the top-connecting portion 26 by an inset distance, so that the clip means 21 is capable of being clipped over a forward rim 31 of a cylindrical air intake hose 30 for a fuel injector with the flexible arm 27 on an exterior surface of the air intake hose 30. The top-connecting portion 26 rests on the forward rim 31 of the air intake hose 30, and the rigid arm 25 rests against an interior wall of the air intake hose 30. The airfoil 22 and 22A extends from the interior wall to a central point in the air intake hose 30 with the outer edge 23 centrally positioned in the air intake hose 30. The airfoil 22 and 22A is spaced from the forward rim 31 of the air intake hose 30 by the inset distance, and is capable of generating a spiral vortex 40 of air from the outer edge 23 of the airfoil 22 and 22A into the air intake hose 30. The spiral vortex 40 of air is concentric with the cylindrical air intake hose 30, and moves toward the fuel injector, as shown in FIG. 4.

The airfoil 22 and 22A is capable of being adjusted in width so that the outer edge 23 of the airfoil blade 22 and 22A is positioned in the center of any of a variety of sizes of air intake hoses 30, which are used for fuel injectors.

Figure 1:
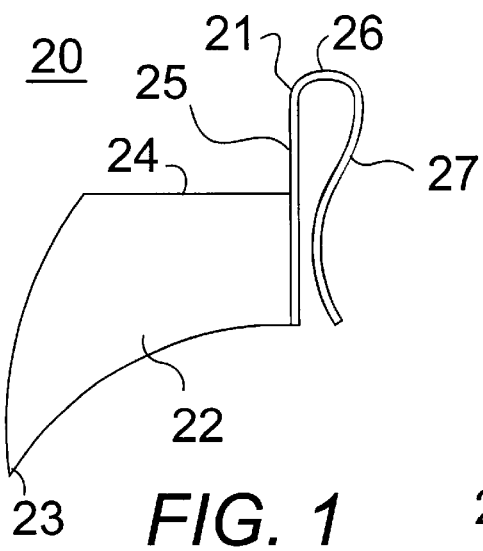
FIG. 1 is a front elevational view of the preferred embodiment of the invention.
Figure 4:
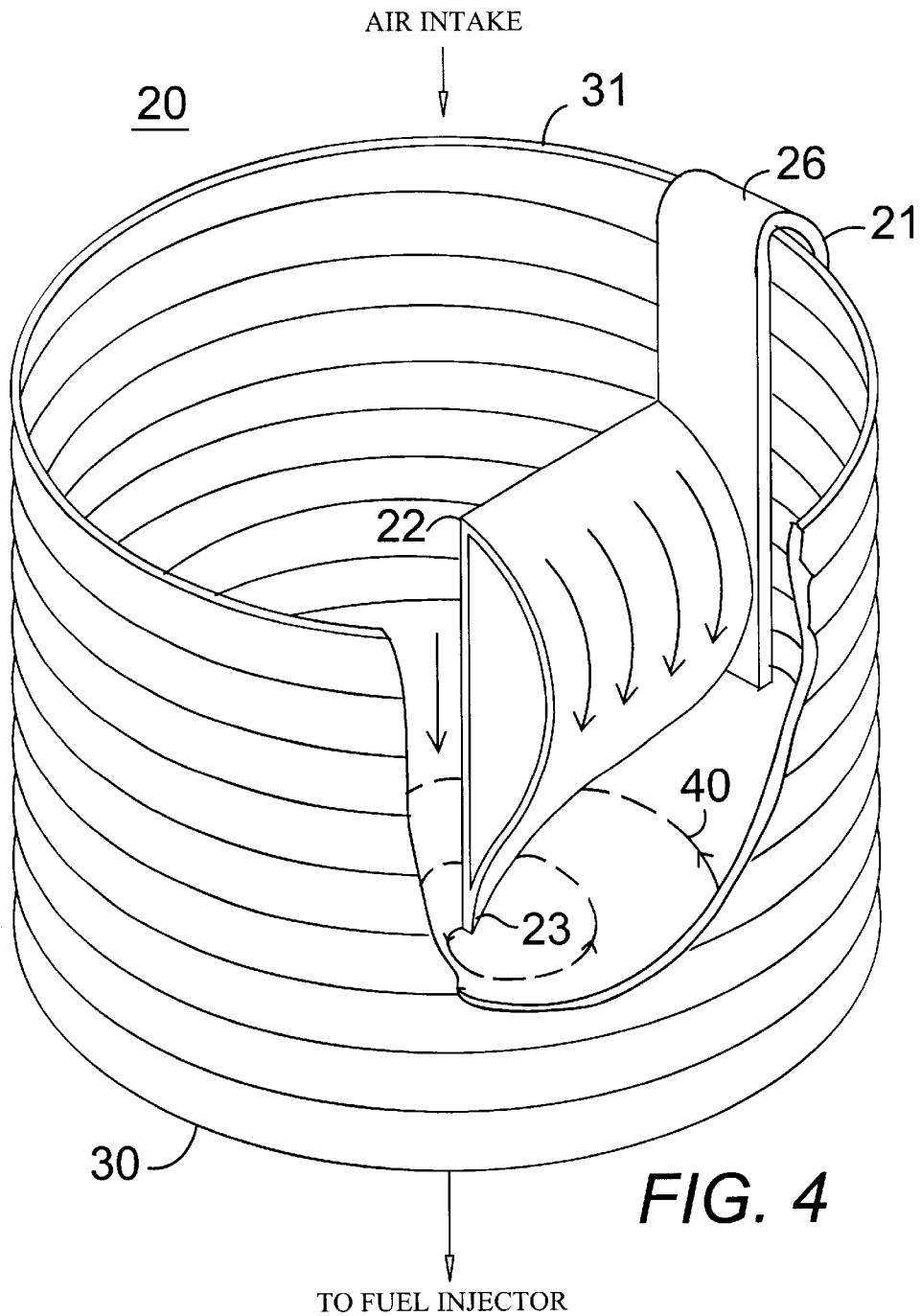
FIG. 4 is a perspective view of the preferred embodiment of the invention of FIG. 1 showing the airflows over the airfoil body and the spiral vortex generated by the mixing of the airflows, with the spiral vortex concentric with the cylindrical hose.

The airfoil 22 shown in FIGS. 1, 2 and 4 can be fabricated of a material, such as a shaped rubberized synthetic material, which is capable of being cut to adjust its width and to form the outer edge 23 at any desired distance from the clip means 21. The material is preferably Duralco®, a heat resistant and chemical resistant rubber-like material that holds its shape under heat and can be cut to size.

Figure 3:
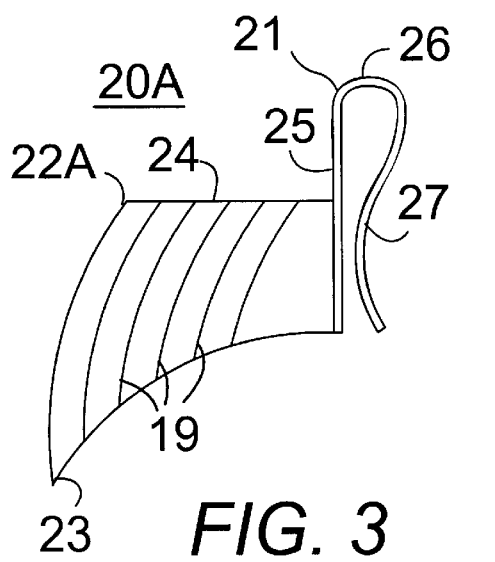
FIG. 3 is a front elevational view of an alternate embodiment of the invention with perforation lines along the airfoil body.

In FIG. 3, an alternate embodiment of the device 20A is shown that has an airfoil body 22A that is fabricated with a series of linear perforated lines or scores 19 that run parallel to the clip 21 with each of the perforated lines or scores 19 spaced apart from the clip 21 a distance equal to half a diameter of a standard fuel injector air intake hose 30. Portions of the airfoil body 22A are capable of being broken away at a desired perforated line 19 to adjust its width and to form an outer edge 23 of the airfoil body 22A, which is capable of being positioned in the center of the standard fuel injector air intake hose 30 with the clip 21 attached to the standard fuel injector air intake hose 30. The alternate airfoil body 22A is fabricated of molded plastic.

In practice, the user would separate the standard fuel injector air intake hose 30 from the air intake portion of the engine (not shown). The user would then modify the width of the airfoil body 22 and 22A, so that the outer edge 23 of the airfoil blade 22 and 22A can be positioned in the center of the air intake hoses 30, as shown in FIG. 4. To modify the preferred embodiment of the device 20, which is formed of a shaped rubberized synthetic material, the user would cut the airfoil body 22 to form the outer edge 23 at any desired distance from the clip means 21. To modify the width alternative embodiment 20A, which is fabricated from a molded plastic, the user would break away a portion of the airfoil body 22A at a desired perforated line 19 to form an outer edge 23 of the airfoil body 22A, at any distance from the clip means 21. Once the airfoil body 22 or 22A size has been adjusted, the device 20 or 20A would be mounted on the standard fuel injector air intake hose 30 by slipping the clip means 21 over the forward rim 31 of the air intake hose 30, as shown in FIG. 4. The rigid arm 25 would be on the interior of the hose 30 and the flexible arm 27 on the exterior surface of the air intake hose 30. The top of the clip 26 should rest on the forward rim 31 and the outer edge 23 should be centrally located in the standard fuel injector air intake hose 30. The user would then replace the standard fuel injector air intake hose 30.

It is understood that the preceding description is given merely by way of illustration and not in limitation of the invention and that various modifications may be made thereto without departing from the spirit of the invention as claimed.

What is claimed is:

1. A vortex generating fuel saving device for an air intake to a fuel injector, the device comprising:

an airfoil comprising an airfoil body having a convex face on one side of the airfoil body having a curved surface capable of receiving an airflow along a path over the convex face, an opposite face on the other side of the airfoil body, the opposite face having a straighter surface than the curved surface, the straighter surface capable of receiving an airflow along a shorter path than that of the convex face, and an outer edge between the two faces, so that the two airflows meet along the outer edge and create a spiral vortex of air spiraling off of the outer edge in the direction of the airflows;

a clip means having an elongated rigid arm with a flat airfoil receiving face and an elongated flexible arm spaced apart from and attached to the rigid arm by a top connecting portion, the rigid arm having the airfoil permanently attached thereto on the flat airfoil receiving face spaced apart from the top connecting portion by an inset distance, so that the clip means is capable of being clipped over a forward rim of a cylindrical air intake hose for a fuel injector with the flexible arm on an exterior surface of the air intake hose, the top connecting portion resting on the forward rim of the air intake hose, and the rigid arm against an interior wall of the air intake hose and the airfoil extending from the interior wall to a central point in the air intake hose with the outer edge centrally positioned in the air intake hose, the airfoil being spaced from the forward rim of the air intake hose by the inset distance, the airfoil being capable of generating a spiral vortex of air from the outer edge of the airfoil into the air intake hose, the spiral vortex of air being concentric with the cylindrical air intake hose, the spiral vortex of air moving toward the fuel injector.

2. The device of claim 1 wherein the airfoil is capable of being adjusted in width so that the outer edge of the airfoil blade is positioned in a center of any of a variety of sizes of fuel injector air intake hoses.

3. The device of claim 2 wherein the airfoil is fabricated of a material capable of being cut to form the outer edge at any desired distance from the clip means.

4. The device of claim 3 wherein the airfoil is fabricated of a shaped rubberized synthetic material.

5. The device of claim 2 wherein the airfoil body is fabricated with a series of linear perforated lines or scores running parallel to the clip with each of the perforated lines or scores spaced apart from the clip a distance equal to half a diameter of a standard fuel injector air intake hose, so that a portion of the airfoil body is capable of being broken away at a desired one of the perforated lines or scores to form an outer edge of the airfoil body along the which is capable of being positioned in the center of the standard fuel injector air intake hose with the clip attached to the standard fuel injector air intake hose.

6. The device of claim 5 wherein the airfoil body is fabricated of molded plastic.

7. The device of claim 1 wherein the flexible arm of the clip in normally biased toward the rigid arm so that when the clip means is clipped to the fuel injector air intake hose a tension force is created by the flexible arm to hold the device in place on the fuel injector air intake hose.

8. The device of claim 7 wherein the flexible arm of the clip is fabricated of a flexible metal.

* * * * *